Patented Sept. 29, 1936

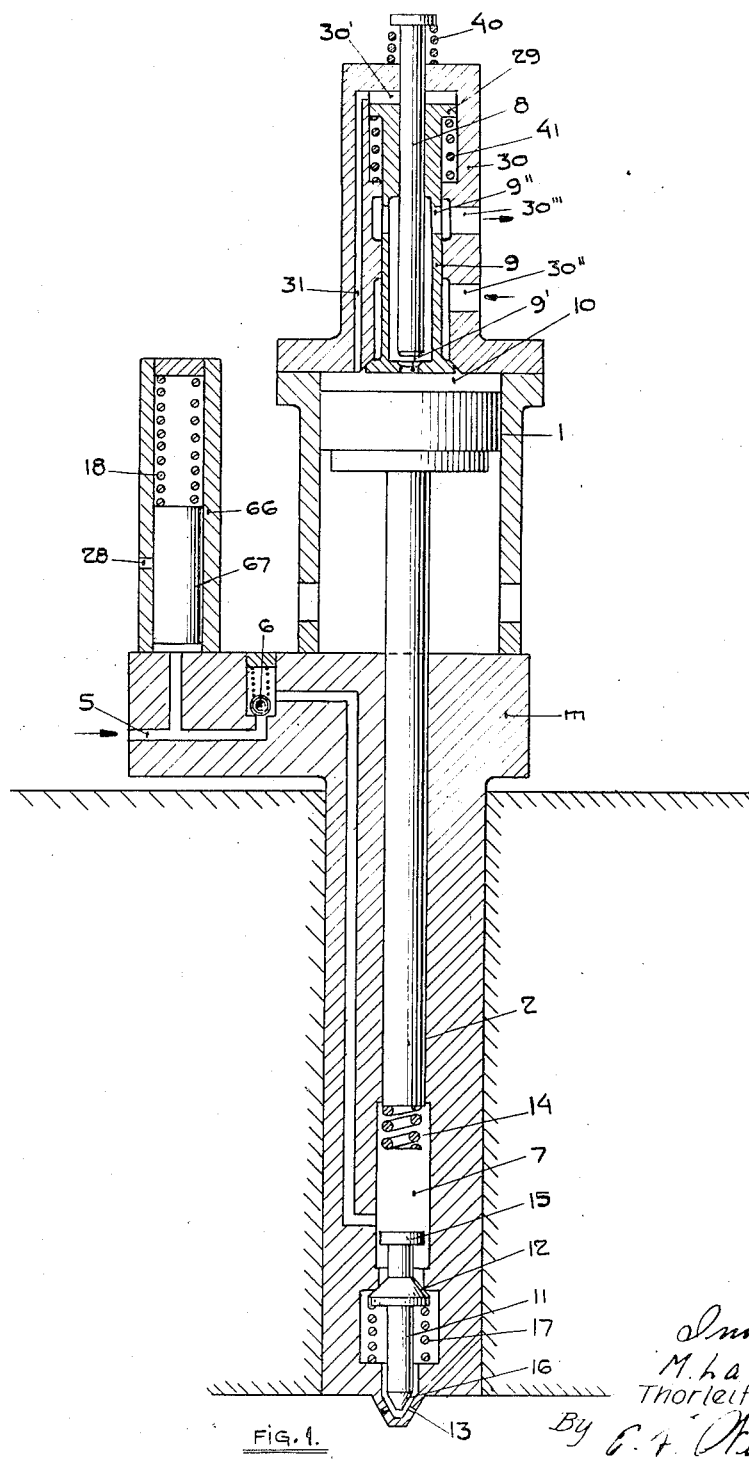

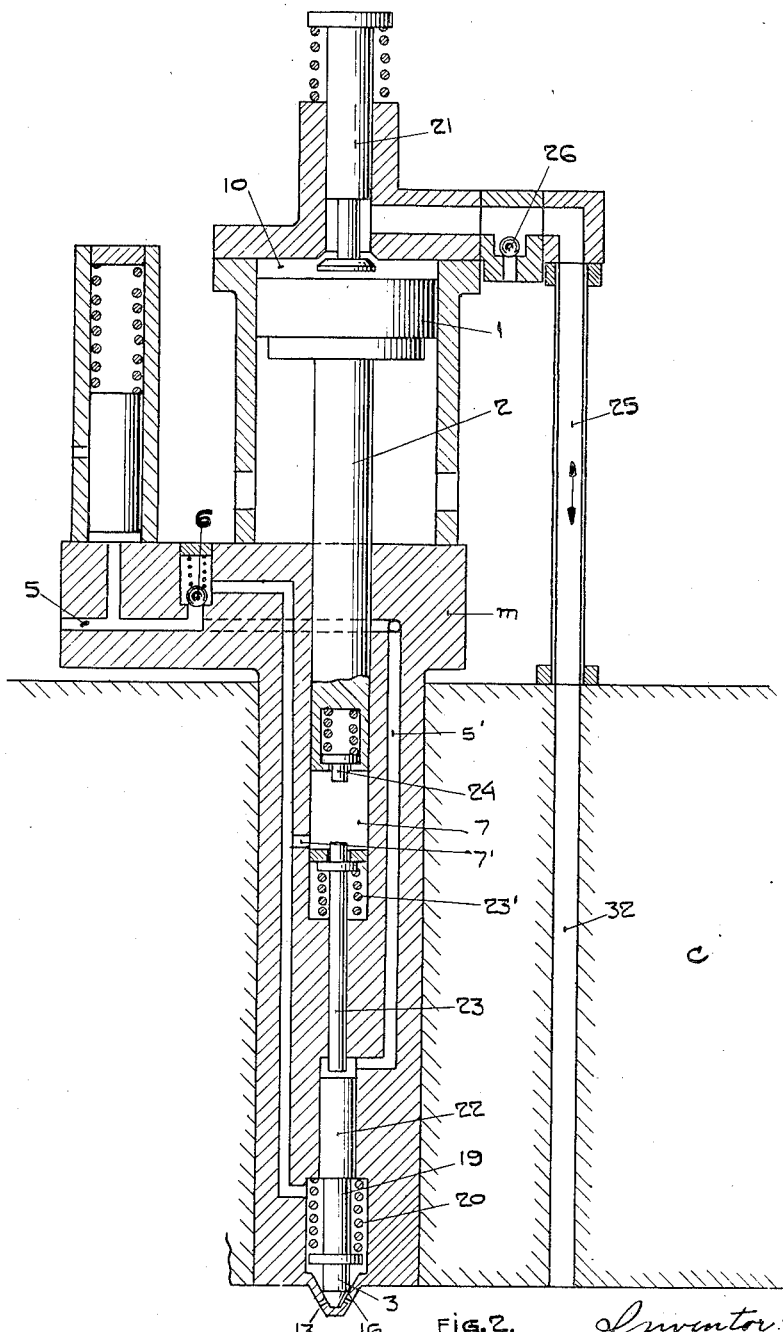

2,055,580

UNITED STATES PATENT OFFICE 2,055,580

INTERNAL COMBUSTION ENGINE

Mauritz Larsson, Malmo, Sweden, and Thorleif Eek, Oslo, Norway, assignors to Kockums Mekaniska Verkstads Aktiebolag, Malmo, Sweden, a corporation of Sweden Application January 8, 1935, Serial No. 906
In Sweden June 7, 1934

3 Claims. (Cl. 299—107.2)

The present invention refers to an improvement in internal combustion engines, and more specifically it refers to such engines acting without a compressor for the fuel mixture. Still more specifically it refers to engines of the kind in which the fuel oil is fed forward to the fuel injection means of the engine cylinder by means of a so-called charging pump acting at a comparatively low pressure, whereas the high pressure required for the injection proper is effected by means of a high pressure direct injection pump preferably driven by a compressed gaseous fluid.

In engines of the type referred to, the high pressure injection pump is usually provided with a differential piston the greater working face of which is subjected to the action of the compressed driving fluid, whereas the smaller working face of the same is caused to exert the injection pressure on the fuel oil. When the oil pressure has been brought up to a predetermined value by means of the high pressure pump, said pressure, in a manner known per se, causes the opening of a spring-closed injection needle valve through which the fuel oil is introduced into the engine cylinder.

When the oil pressure, due to the injection, has decreased in a sufficient degree to permit the spring action to overcome the same, the interruption of the fuel injection is performed by closing of the needle valve. This interruption is not performed with the sufficient rapidity, or suddenness, and the delay with regard to the closing moment causes an after-dripping resulting in an incomplete combustion and the formation of coke deposits within the engine cylinders.

The primary object of the invention is to eliminate this drawback, and measures are taken, according to the same, to cause the valve member adapted for closing of the injection nozzle to be positively forced against its seat for the purpose of interruption of the fuel injection whilst the full injection pressure is still at hand, and thereby the closing action of the valve is performed under circumstances adapted effectively to prevent an after-dripping.

Furthermore, the invention includes also a specific construction of the valve means coacting with the injection nozzle for interruption purposes, and an accumulator means adapted temporarily to collect the quantity of fuel fed forward by the charging pump and not intended for immediate injection by the high pressure pump.

Finally, the invention also includes a special valve means for control of the admission and discharge of the compressed fluid used for actuation of the high pressure pump.

The invention is illustrated in the accompanying drawings which show two different embodiments of the same, both of the figures in the drawings being diagrammatical, and Fig. 1 shows an embodiment of the invention in connection with a high pressure pump and seen in a longitudinal section at the longitudinal axis of the injection nozzle.

Fig. 2, in the same manner, shows another embodiment of the invention.

In the embodiments shown in the drawings, the high pressure pump is supposed to consist of a piston pump provided with a differential piston the larger piston member 1 of which is adapted to work with in a cylinder 10 and to be driven by means of compressed air, or gas, whereas the smaller piston member 2 of the same is shaped as a plunger and mounted in a bore, or cylinder, 7, provided in the nozzle body $m$ inserted in the top cover $c$ of the engine cylinder. The compressed gas cylinder 10 is positioned exteriorly of the nozzle body (at its upper end) and the top cover of the same is provided with a control valve for the compressed gas.

The apparatus is supposed to be constructed under the condition that the quantity of fuel intended to be injected into the working cylinder is controlled by the charging pump, acting at low pressure and not shown in the drawings, so that the fuel enters the inlet channel 5 of the nozzle body in a controlled quantity.

The said channel 5 debouching into the bore 7 is provided with a non-return valve 6, and in advance of this valve the channel 5 stands in communication with an accumulator consisting of a piston 67 reciprocably mounted within a cylinder 66 and acting against a resilient load, for instance a spring 18, such piston being adapted to be displaced within the cylinder by influence from the fuel pressure for accumulation of the fuel within the cylinder. The cylinder wall is provided with a port 28 positioned in such a manner that it is normally covered by the piston but uncovered thereby when the end face of the piston reaches the port at the end of its upward stroke. The fuel will then be permitted to escape through said port which serves as a safety valve for the fuel admission pipe.

In the embodiment according to Fig. 1, the fuel valve member 11 provided at the inner end of the nozzle body $m$ is constructed in the shape of a double valve adapted to coact with a seat 16 for closing of the injection bores 13 of the nozzle, and with another seat 12 for closing in the opposite direction. The valve member 11 is kept pressed against the seat 12 by means of a spring 17. At its outer end, counted in a direction from the engine cylinder, the valve member 11 may be provided with an abutment flange 15 adapted to support the inner end of the high pressure plunger 2, either directly or by means of a spring 14 affixed to the said plunger end, when the injection is to be interrupted at the end of the injection stroke of the high pressure plunger, and when the valve member 11 is to be pressed towards the seat 16.

The high pressure fuel pump may be driven by compressed air, or other compressed gaseous fluid, and a valve means controlled by the movements of the engine may be used for control of the admittance and discharge of the compressed driving fluid to, and from, the driving means of the pump. According to Fig. 1, the said control valve means consists of two concentrically positioned valve members, i. e. an inner valve member 8 and an outer one 9 having a common longitudinal axis. The inner valve member 8 is provided with a tightening surface at its inner end adapted to coact with an outlet opening 9' in the outer valve member 9, and the last mentioned valve member is adapted to coact with an inlet port for the compressed gas to the working chamber of the high pressure pump, such gas entering the valve housing 30 by means of a port 30''. The compressed gas discharged by the inner valve member passes through ports 9'' in the hollow outer valve member, and through a channel 30''' in the valve housing 30. During the discharge of the compressed gas, the inner valve member is kept raised from its seat in the outer valve member by means of a spring 40, and then the outer valve member is kept pressed against its seat in the valve housing by means of a spring 41.

The outer end of the outer valve member 9 is shaped into a pressure relieve piston 29 reciprocably mounted within a cylinder 30' in the valve housing. By means of a channel 31 the said cylinder 30' stands in connection with the working cylinder 10 of the high pressure pump. When the moment of injection is at hand, the inner valve member 8 is mechanically pressed inwardly (downwardly) against the action of the spring 40. When the said valve member becomes seated against the opening 9', the outer valve member 9 is brought to take part in the movement, and the compressed gas is admitted into the cylinder 10. The outward (upward) pressure of the gas within the cylinder 10 on the valve members 8, 9 is compensated for by the pressure relieve piston 29, as the cylinder 30' will get the same pressure as the cylinder 10 due to the channel 31.

The manner of action of the construction according to Fig. 1 is as follows:—

The fuel oil coming from the charging pump by the channel 5 passes the non-return valve 6 and enters the cylinder 7. Hereby the piston 2, 1 is pressed outwardly (upwardly) just as much as corresponds to the introduced quantity of fuel. When the injection shall take place, the valve means 8, 9 admits the compressed gas into the cylinder 10, the piston 1, 2 is pressed inwardly (downwardly), the non-return valve 6 closes, and the fuel oil is pressed past the seat 12 of the double valve 11 and is injected into the combustion chamber of the engine through the nozzle bores 13. When the piston 2 has moved so far that the spring 14 reaches the abutment flange 15 on the double valve 11, the said valve is pressed inwardly against the seat 16. Hereby the injection bores 13 are suddenly closed, and the fuel injection is interrupted. The piston 2 is arrested by the fuel oil at hand within the cylinder 7. The pressure gas is permitted to escape from the cylinder 10 immediately after the interruption of the fuel injection. The piston 2 and the valve 11 are pressed outwardly by the springs 17 and 14, and the valve 11 is pressed against the seat 12. The fuel oil which perhaps may have been entered into the channel 5 during the injection period, has been collected in the accumulator 18, and the piston therein is pressed outwardly according to the quantity of oil accumulated. The working process just described is repeated at the next fuel injection.

In the embodiment according to Fig. 2, the seat 12 for the valve member 3 is replaced by a piston 22 provided at the outer end of said valve member, such piston being tightly mounted within a bore in the nozzle body m. The two end faces of the piston 22 stand under influence of the fuel pressure in that the inner end is subjected to the pressure within the valve chamber 19 containing the valve member 3 and connected with the inlet channel including the non-return valve 6, whereas the outer end face of the same is subjected to the pressure within a channel 5' directly communicating with the channel 5 in advance of the non-return valve. The valve member 3 is also acted upon by a spring 20 tending to press it against the seat 16 provided with the injection bores 13.

The fuel oil chamber, or cylinder, 7 of the high pressure pump stands in connection with the channel 5 behind the non-return valve by means of a side port 7'. A spring-pressed abutment member 24 may be provided at the inner end of the high pressure piston 2, and for the transmission of the movement of said piston to the piston 22 a spindle 23 is displaceably mounted in its direction of length within the nozzle body between the pistons 2 and 22. The spindle 23 is acted upon by a return spring 23' which tends to return the same to its original position after having been pressed inwardly by the piston 2. The valve member 3, 22, the differential piston 2, 1 of the high pressure pump, and also the spindle 23 are all mounted in the extension of each other so as to have a common longitudinal axis.

The compressed gas used for driving of the high pressure pump is supposed, in this instance, to be taken from the working cylinder of the engine through a channel 32 communicating with the compressed gas valve 21 of the pump by means of a tube 25. A vacuum relieve valve 26 may be mounted between the valve 21 and the pipe 25. The total volume of the channel 32 and the pipe 25 is at least as great as the maximal stroke volume of the piston member 1.

The manner of action of the construction according to Fig. 2 is as follows:—

The fuel oil coming from the charging pump (not shown) by the channel 5 flows past the non-return valve 6 and arrives into the chambers 7 and 19. Hereby the piston aggregate 2, 1 is pressed upwardly a distance corresponding to the quantity of fuel fed in. The valve 3 is still kept pressed against its seat 16 by means of the spring 20. When the injection shall take place, the valve 21 admits the compressed gas into the cylinder 10 by means of the pipe 25 from the working cylinder of the engine. The piston aggregate 2, 1 is pressed inwardly, the non-return valve 6 is closed, and the pressure is transmitted to the chamber 19. Then the piston 22 and thereby also the valve member 3 are pressed outwardly against the inner end of the spindle 23, and the fuel oil is injected into the engine cylinder through the nozzle bores 13. When the piston aggregate 2, 1 has moved inwardly so far that the abutment 24 reaches the outer end of the spindle 23, the said spindle and also the valve member 3 are brought to join in in the inward movement, until the valve 3 reaches the seat 16 and closes the injection bores 13 so that the injection is interrupted. When the pressure within the working cylinder of the engine, and thereby also within the pipe 25 and the cylinder 10, has decreased in a sufficient degree, the piston aggregate 2, 1 is again pressed outwardly by the fuel oil, but the valve member 3 remains against its seat, whereas the spindle 23 returns to its former position. During the suction stroke of the engine, fresh air is sucked in through the vacuum relieve valve 26 into the pipe 25 which thus will contain fresh air at a low temperature.

The invention is not limited to the embodiments described above and shown in the drawings for the sake of an explanation, but deviation therefrom may be made within the scope of invention and for the adaption to practice of the same under different conditions, as will easily be understood by those skilled in the art.

What we claim and desire to secure by Letters Patent is:—

1. A fuel injector comprising a body portion forming a cylinder, a plunger therein, a fuel supply conduit which is provided with a check valve and leads to the cylinder space beneath the plunger, an injection nozzle which is axially aligned with the cylinder and is connected to the cylinder space beneath the plunger, pressure fluid operated means for moving the plunger in the direction for forcing fuel supplied to the space beneath the plunger to the injection nozzle, a control valve for the injection nozzle, which is normally closed and is opened to allow injection by the pressure exerted on the fuel when forced to the nozzle by the plunger, and resilient means interposed between the plunger and the injection nozzle valve, whereby the latter is positively moved to closing position against the pressure of the fuel by the plunger before conclusion of the injection stroke thereof, and is held in closed position against the said pressure until it is released at the return stroke of the plunger.

2. A fuel injector as claimed in claim 1, in which the plunger on its lower end carries a spring adapted to strike the nozzle control valve for moving it to closing position.

3. A fuel injector as claimed in claim 1, in which the nozzle control valve is provided with a piston movable in a cylinder bore in the body portion and acted upon on its upper side by the pressure of the fuel in the fuel supply conduit in front of the check valve thereof, and on its lower side by the pressure of the fuel in the cylinder space beneath the plunger.

MAURITZ LARSSON.
THORLEIF EEK.